(12) United States Patent
Yamada

(10) Patent No.: US 8,054,555 B2
(45) Date of Patent: Nov. 8, 2011

(54) SIGHTING DEVICE

(75) Inventor: Kenji Yamada, Yachiyo (JP)

(73) Assignees: Nikon Vision Co., Ltd., Tokyo (JP); Nikon Corporation, Tokyo (JP)

( * ) Notice: Subject to any disclaimer, the term of this patent is extended or adjusted under 35 U.S.C. 154(b) by 122 days.

(21) Appl. No.: 12/028,800

(22) Filed: Feb. 9, 2008

(65) Prior Publication Data

US 2008/0137195 A1 Jun. 12, 2008

Related U.S. Application Data

(63) Continuation of application No. PCT/JP2006/321930, filed on Oct. 26, 2006.

(30) Foreign Application Priority Data

Nov. 8, 2005 (JP) ................................ 2005-323040

(51) Int. Cl.
G02B 25/00 (2006.01)
G02B 27/14 (2006.01)
(52) U.S. Cl. ........................ 359/645; 359/634; 359/637
(58) Field of Classification Search .................. 359/428, 359/643–647, 629–631, 634, 637
See application file for complete search history.

(56) References Cited

U.S. PATENT DOCUMENTS

| 3,942,901 | A | * | 3/1976 | Ekstrand | 356/251 |
| 3,963,356 | A | * | 6/1976 | Wiklund | 356/251 |
| 5,801,885 | A | * | 9/1998 | Togino | 359/630 |
| 6,373,628 | B1 | | 4/2002 | Gunnarsson et al. | |

FOREIGN PATENT DOCUMENTS

| JP | 07-056088 A | 3/1995 |
| JP | 2002-538403 A | 11/2002 |
| JP | 2003-504592 A | 2/2003 |
| WO | WO 01/06199 A1 | 1/2001 |

OTHER PUBLICATIONS

Translation of International Preliminary Report on Patentability from parent PCT application.

* cited by examiner

Primary Examiner — Scott J Sugarman
(74) Attorney, Agent, or Firm — Miles & Stockbridge P.C.

(57) ABSTRACT

Providing a sighting device having a simple structure, being easy to manufacture and free from parallax. A sighting device comprises, in order from a target object side, a positive meniscus lens having a convex surface facing the target object and a negative meniscus lens having a convex surface facing the target object, wherein the surface of said positive meniscus lens that faces away from said target object or the surface of said negative meniscus lens that faces toward said target object is adapted to constitute a semi-transparent reflection surface or a wavelength selective reflection surface, and a point source is provided at a focal point of a catadioptric optical system constituted by said semi-transparent reflection surface or said wavelength selective reflection surface and a refracting surface of the negative meniscus lens having with the convex surface facing said target object, the refracting surface facing away from said target object side.

21 Claims, 6 Drawing Sheets

SIGHTING DEVICE

CROSS-REFERENCE TO RELATED APPLICATION

This application is a continuation of International Application No. PCT/JP2006/321930 filed Oct. 26, 2006.

TECHNICAL FIELD

The present invention relates to a sighting device, in particular to a sighting device mounted on a gun or the like when used and called a dot sight, which has a built-in point source of light.

BACKGROUND ARTS

Sighting devices having a built-in point source have conventionally been known. For example, there is a known sighting device in which a semi-transparent concave mirror is provided in the interior thereof and a point source is provided at the focal point of the concave mirror to deliver parallel reflected light to a viewer's eye while allowing light from a target object to be transmitted as it is without being refracted to deliver it to the viewer's eye. In this sighting device, a person who sees though the sighting device will aim while observing a target object and a point image that suggests the point of impact in an overlapping manner. In this case, if the reflected light is not parallel or the transmitted light is refracted, parallax will occur when there is a misalignment between the optical axis of the viewer's eye and the optical axis of the sighting device, which will make precise sighting impossible. In view of this, to prevent such a disadvantage, the concave mirror is designed to be a paraboloidal, and the opposite convex surface is designed to be ellipsoidal or hyperboloidal (see, for example, Japanese Patent Application Laid-Open No. 7-56088).

The above described prior art suffers from a problem that manufacturing thereof is difficult since use is made of a sophisticated aspherical surface that is introduced to achieve a sighting device that is free from parallax.

DISCLOSURE OF THE INVENTION

An object of the present invention is to provide a sighting device that is free from parallax and has a simple structure that can be manufactured easily.

To achieve the above object, according to the present invention, there is provided a sighting device characterized by comprising, in order from a target object side, a meniscus lens having positive refractive power with a convex surface facing toward said target object and a meniscus lens having negative refractive power with a convex surface facing toward the target object, wherein a surface of said meniscus lens having positive refractive power that faces away from said target object or the surface of said meniscus lens having negative refractive power that faces toward said target object is adapted to constitute a semi-transparent reflection surface or a wavelength selective reflection surface, and a point source is provided at a focal point on an optical axis of a catadioptric optical system constituted by said semi-transparent reflection surface or said wavelength selective reflection surface and a refracting surface of the meniscus lens having negative refractive power with the convex surface facing toward said target object, the refracting surface facing away from said target object side.

According to the present invention, a sighting device free from parallax can be obtained without using a sophisticated aspherical surface.

BEST MODE FOR CARRYING OUT THE INVENTION

In the following, the best mode of the sighting device according to the present invention will be described.

EXAMPLE 1

Figure 1:
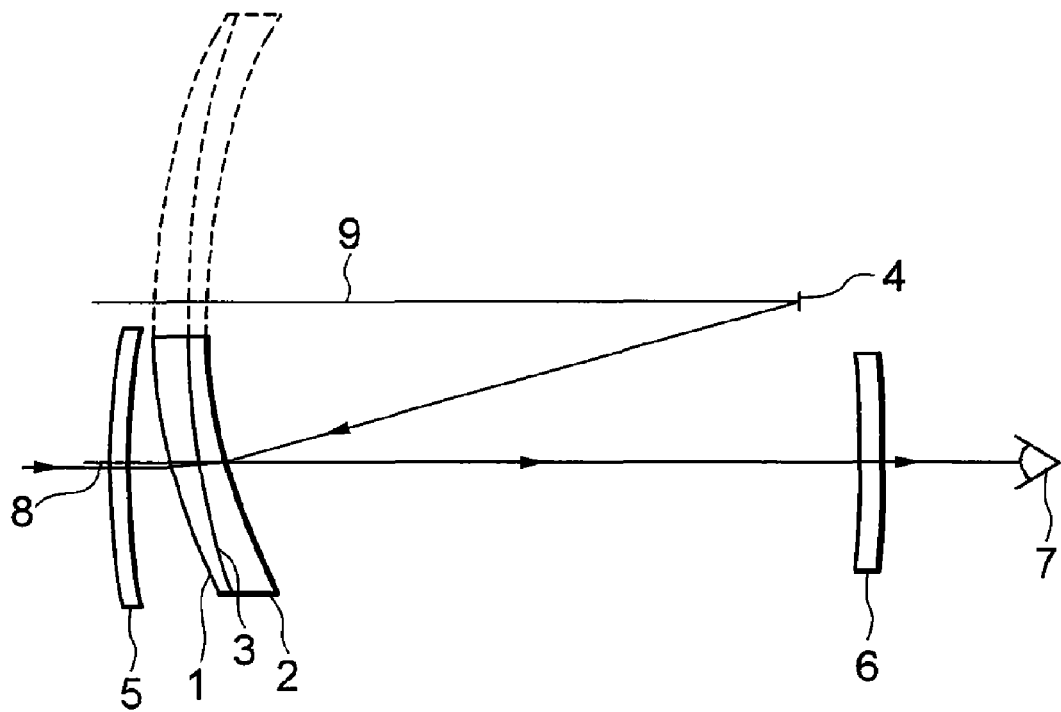
FIG. 1 is a diagram showing the configuration of an optical system according to Example 1.

FIG. 1 is a diagram showing the configuration of an optical system according to Example 1. A cemented surface of a cemented lens composed of a meniscus lens 1 that has a convex surface facing the target object and has positive refractive power and a meniscus lens 2 that has a convex surface facing the target object and has negative refractive power is adapted to serve as a half-transparent reflection surface 3 or a wavelength selective reflection surface 3. Each meniscus lens is only a segment of a corresponding whole round lens, as illustrated by the broken lines, and the whole round lenses have a common optical axis 9. A point source 4 is provided at a focal point on the optical axis 9. A catadioptric optical system 2, 3 is constituted by the aforementioned reflection surface 3 and the refracting surface of the meniscus lens 2 having a convex surface facing the target object and having negative refractive power that faces away from the target object. The aforementioned catadioptric optical system 2, 3 is designed to make use only of a part of the entire lens system illustrated by broken lines, and consequently the point source of light 4 can be disposed at a position outside the field of view. Furthermore, a dust prevention lens 5 on the target object side and a dust prevention lens 6 on the viewer's eye 7 side have refractive power substantially equal to zero and prevent dust and rain drops etc. from entering the interior of the casing. They may be replaced by plane parallel glasses, but designing them to have slightly curved surfaces makes undesirable reflected light less conspicuous.

Figure 2:
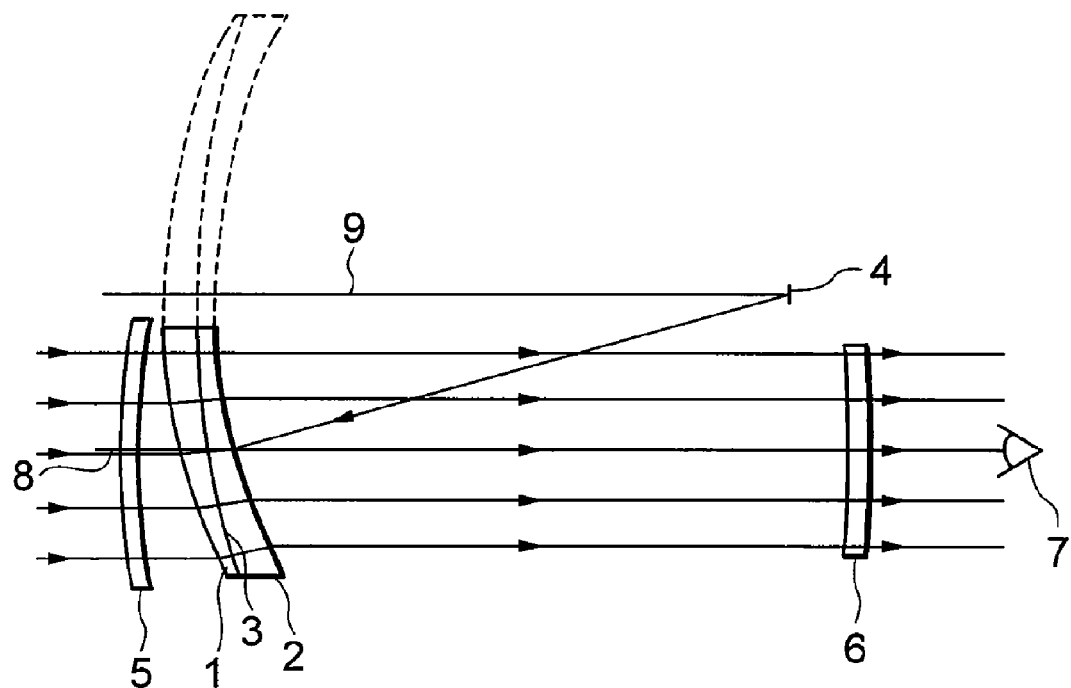
FIG. 2 is an optical path diagram showing how light beams from a target object are transmitted in the optical system according to Example 1.

FIG. 2 is optical path diagram showing how light beams from the target object are transmitted in the optical system according to Example 1. For the transmitted light, refractive power of the lens system composed the positive meniscus lens 1 and the negative meniscus lens 2 is substantially zero, and substantially parallel beams of light coming from a faraway target object reach the viewer's eye 7 still as parallel beams without being deflected substantially. In the case where light beams are far from parallel, displacement of the viewer's eye 7 along the vertical direction in the plane of FIG. 2 relative to the optical axis 8 causes changes in the direction of the rays incident on the viewer's eye 7, whereby parallax occurs. Consequently, the position of the target object as viewed will change along the vertical direction, which hampers precise sighting.

Figure 3:
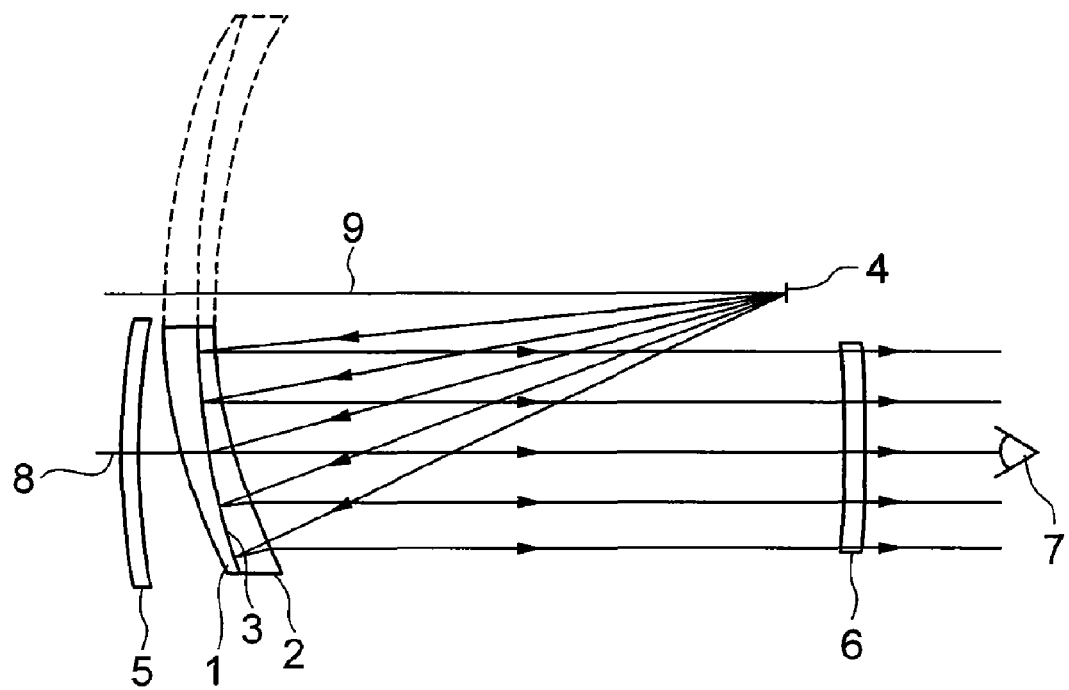
FIG. 3 is an optical path diagram showing how light beams from a point source are reflected in the optical system according to Example 1.

FIG. 3 is an optical path diagram showing how light beams from the light source are reflected in the optical system according to Example 1. The light beams emitted from the point source 4 are reflected by the reflection surface 3 and reach the viewer's eye 7 as substantially parallel light beams. In the case where the light beams are far from parallel, displacement of the viewer's eye 7 along the vertical direction in the plane of FIG. 3 relative to the optical axis 8 causes changes in the direction of the rays incident on the viewer's eye 7, whereby parallax occurs. Consequently, the position of the light source suggesting the point of impact as viewed will change along the vertical direction, which hampers precise sighting.

Accordingly, it is important that both the transmitted the light beams from the target object and the reflected light beams from the point source 4 be parallel beams. If this is the case, displacement of the viewer's eye 7 along the vertical direction relative to the optical axis 8 will not lead to occurrence of parallax in neither the target object nor the point source of light, and precise sighting can be achieved. Conversely, if the above condition is not satisfied, parallax will occur either one of or both of the target object and the point source, and precise sighting cannot be achieved.

In the following, numerical values associated with the elements in Example 1 are presented in Table 1. In table 1, the surface numbers are assigned in order from the target object side. In table 1, r1 to r7 represent the radii of curvature of the respective lens surfaces (in units of mm), d1 to d6 represent the distances between adjacent lens surfaces (in units of mm), n1 to n4 and v1 to v4 represent the refractive indices for the d-line (wavelength λ=587.562 nm) and the Abbe constants of the glass materials of which the respective lenses are made.

TABLE 1

| Surface Number | Curvature Radius | Surface Distance | Refractive Index | Abbe Number |
|---|---|---|---|---|
| 1 | r1 = 100.000 | d1 = 2.000 | n1 = 1.51680 | v1 = 64.10 |
| 2 | r2 = 99.200 | d2 = 2.565 | | |
| 3 | r3 = 74.385 | d3 = 4.000 | n2 = 1.51680 | v2 = 64.10 |
| 4 | r4 = 106.657 | d4 = 2.000 | n3 = 1.51680 | v3 = 64.10 |
| 5 | r5 = 72.300 | d5 = 74.435 | | |
| 6 | r6 = −150.000 | d6 = 2.500 | n4 = 1.51680 | v4 = 64.10 |
| 7 | r7 = −151.250 | | | |

Although the unit of length employed herein is "mm", since optical systems that are proportionally scaled up or down will also achieve the same optical performance, the unit is not limited to "mm", but other suitable units may be employed.

Figure 4:
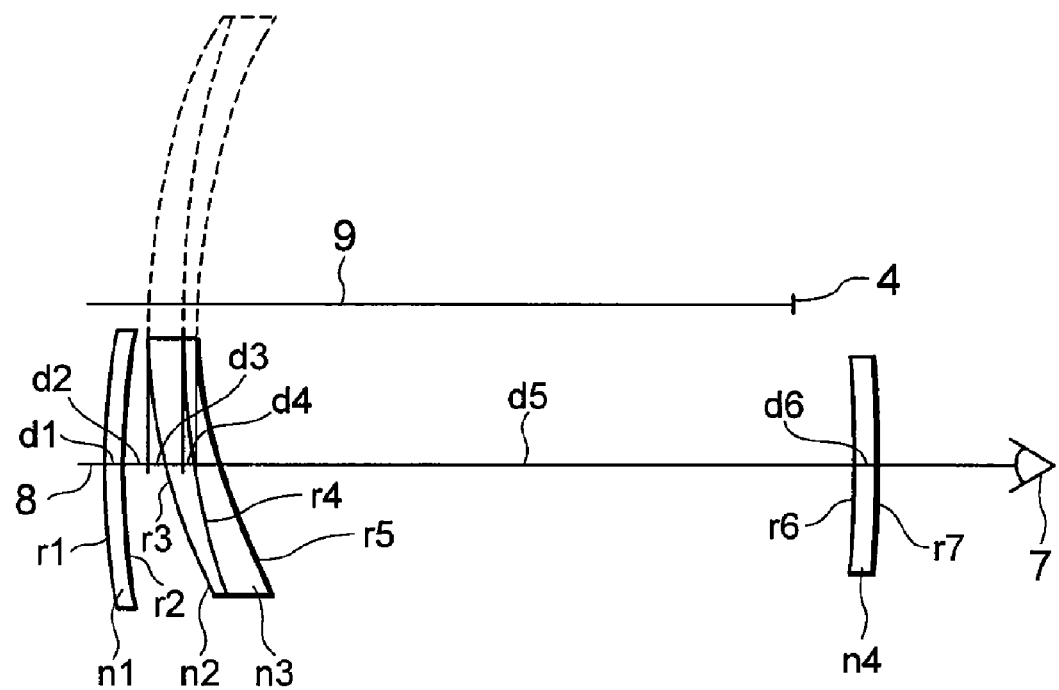
FIG. 4 is a cross sectional view of the optical system according to Example 1, wherein radii of curvature r1 to r7, surface distances d1 to d6 and refractive indices n1 to n4 of the glass materials of which the respective lenses are made are shown.

FIG. 4 is a cross sectional view of the optical system according to Example 1, where r1 to r7 represent the radii of curvature of the respective surfaces, d1 to d6 represent the surface distances as the distances between reference points of the respective lenses on the optical axis 8, where the reference points are the foots of the perpendiculars drawn from the vertices on the optical axis (8, 9) of the respective lens surfaces to the optical axis 8. In addition, n1 to n4 are the refractive indices of the glass material of which the respective lenses are made.

Figure 5:
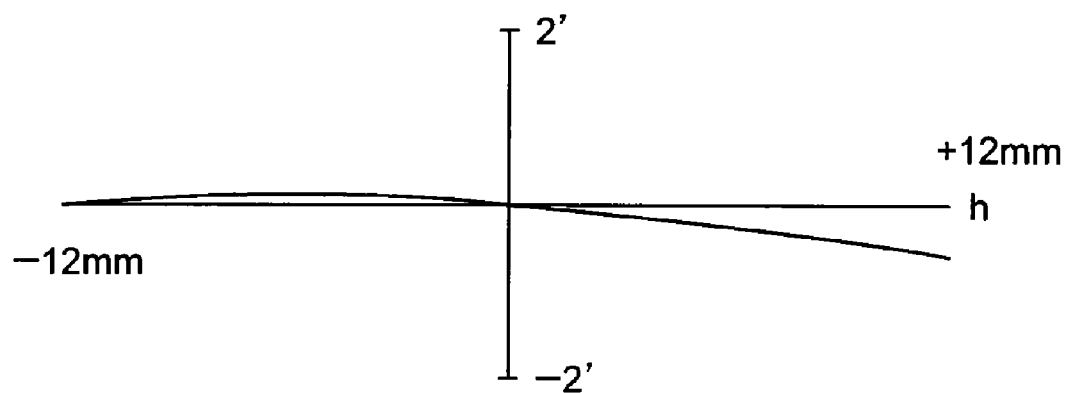
FIG. 5 is a graph showing the degree of parallelism of light beams from a target object relative to the ray at the center of the light beams as they are transmitted in the optical system according to Example 1.

FIG. 5 is a graph showing the degree of parallelism of light beams from a target object as they are transmitted in the optical system according to Example 1, the graph showing the angle relative to the ray at the center of the light beams. On the right of the origin of the graph, positive values represent convergence and negative values represent divergence, while the relation is reversed on the left of the origin. In the graph, h represents the height in the vertical direction from the optical axis 8 on the viewer's eye side, which changes from −12 mm to +12 mm (in the horizontal direction in the graph).

Figure 6:
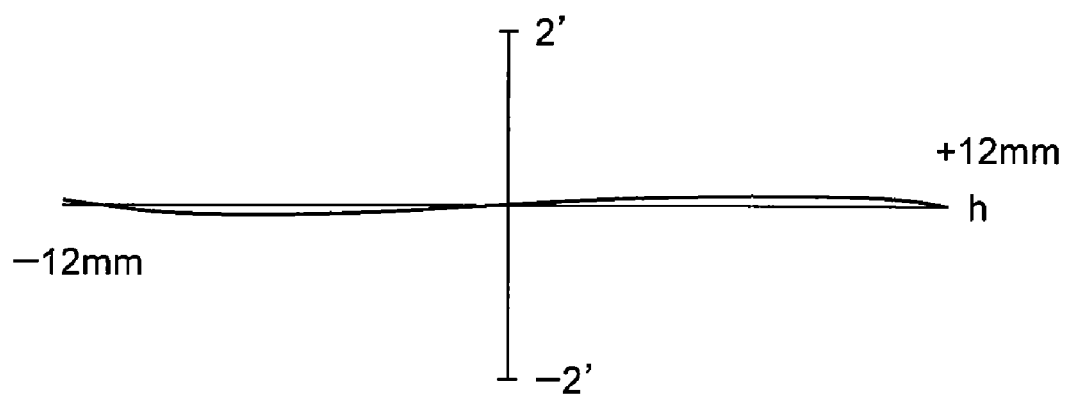
FIG. 6 is a graph showing the degree of parallelism of light beams from a target object relative to the ray at the center of the light beams as they are reflected in the optical system according to Example 1.

FIG. 6 is a graph showing, in the same manner as FIG. 5, the degree of parallelism of light beams from the point source relative to the ray at the center of the light beams as they reflected in the optical system according to Example 1.

EXAMPLE 2

Figure 7:
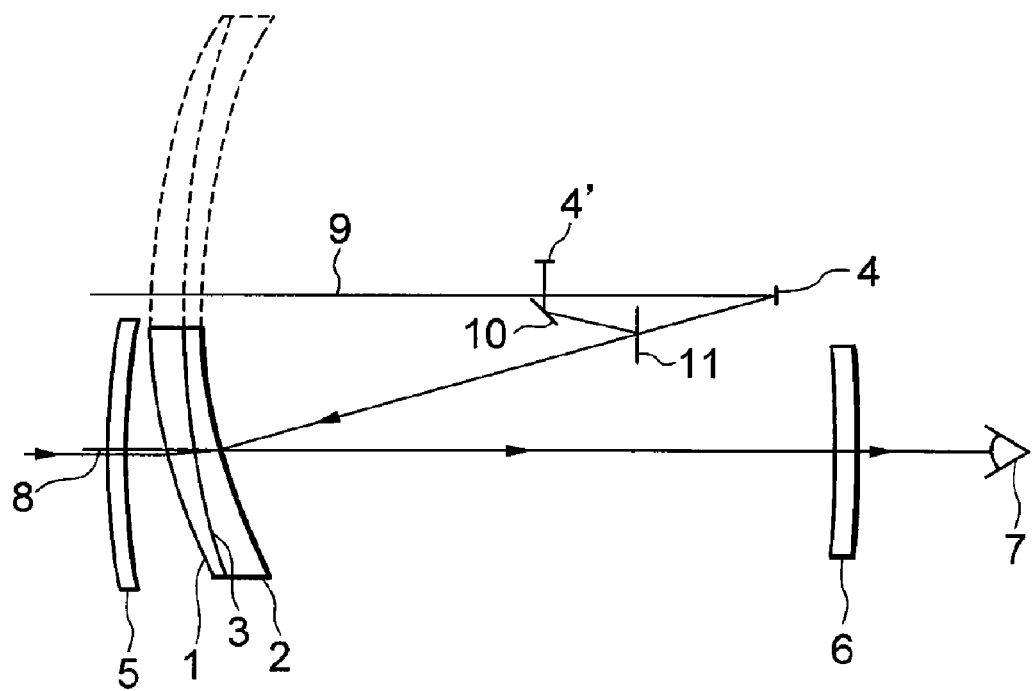
FIG. 7 is a diagram showing the configuration of an optical system according to Example 2.

FIG. 7 is a diagram showing the configuration of an optical system according to Example 2. A point source 4' is disposed at a position that is rendered equivalent to the position of the point source 4 in Example 1 by folding mirrors 10 and 11. The optical characteristic values such as the radii of curvature, surface distances and refractive indices etc. are the same as those in Example 1 and, descriptions thereof will be omitted.

What is claimed is:

1. A sighting device comprising, in order from a target object side:
a meniscus lens having positive refractive power with a convex surface facing toward the target object; and
a meniscus lens having negative refractive power with a convex surface facing toward the target object,
wherein each meniscus lens is only a segment of a corresponding whole round lens, and the whole round lenses have a common optical axis which is offset from a line of sight of the sighting device, said segments being located at a same side of said common optical axis with respect to a perpendicular direction thereto, away from said common optical axis and on the line of sight of the sighting device to be viewed by an observer's eye;
wherein a surface of said meniscus lens having positive refractive power that faces away from said target object or the surface of said meniscus lens having negative refractive power that faces toward said target object is adapted to constitute a semi-transparent reflection surface or a wavelength selective reflection surface,
wherein said semi-transparent reflection surface or said wavelength selective reflection surface and a refracting surface of said meniscus lens having negative refractive power, which refracting surface faces away from said target object side, form a catadioptric optical system,
wherein said meniscus lens having positive refractive power and said meniscus lens having negative refractive power have substantially zero refractive power for light rays transmitting therethrough,
wherein a point source is provided at a side of said semi-transparent reflection surface or said wavelength selective reflection surface where said negative meniscus lens is located and at a focal point of said catadioptric optical system on said common optical axis, to be disposed outside the field of view of the sighting device, and wherein light beams from the target object passing through the sighting device are substantially parallel and the degree of parallelism of the light beams is within ±2 minutes in the distance range of ±12 mm from the line of sight of the sighting device.

2. A sighting device according to claim 1, wherein said meniscus lens having positive refractive power and said meniscus lens having negative refractive power have only spherical surfaces.

3. A sighting apparatus according to claim 1, wherein said meniscus lens having positive refractive power and said meniscus lens having negative refractive power are cemented.

4. A sighting device according to claim 1, wherein said meniscus lens having positive refractive power and said meniscus lens having negative refractive power are made of the same optical material.

5. A sighting device comprising a cemented meniscus lens composed of, in order from a target object side:
a meniscus lens having positive refractive power with a convex surface facing toward the target object cemented, at a cemented surface, with a meniscus lens having negative refractive power with a convex surface facing toward the target object, the cemented meniscus lens as a whole having refractive power substantially equal to zero with a convex surface facing toward said target object,
wherein each meniscus lens is only a segment of a corresponding whole round lens, and the whole round lenses have a common optical axis that is offset from a line of sight of the sighting device, said segments being located at a same side of said common optical axis with respect to a direction perpendicular thereto and away from said common optical axis,
wherein said cemented surface is adapted to constitute a semi-transparent reflection surface or a wavelength selective reflection surface,
wherein said semi-transparent reflection surface or said wavelength selective reflection surface and a refracting surface of said meniscus lens having negative refractive power, which refracting surface faces away from said target object side, form a catadioptric optical system,
wherein a point source is provided at a side of said semi-transparent reflection surface or said wavelength selective reflection surface where said negative meniscus lens is located and at a focal point of said catadioptric optical system on the common optical axis, to be disposed outside the field of view of the sighting device, and
wherein light beams from the target object passing through the sighting device are substantially parallel and the degree of parallelism of the light beams is within ±2 minutes in the distance range of ±12 mm from the line of sight of the sighting device.

6. A sighting device according to claim 5, wherein thickness of the meniscus lens having positive refractive power decreases progressively in a direction away from the common optical axis, and thickness of the meniscus lens having negative refractive power increases progressively away from the common optical axis.

7. A sighting device according to claim 6, wherein each segment extends to the periphery of the corresponding whole round lens.

8. A sighting device comprising, in order from a target object side:
a meniscus lens having positive refractive power with a convex surface facing toward the target object; and
a meniscus lens having negative refractive power with a convex surface facing toward the target object,
wherein each meniscus lens is only a segment of a corresponding whole round lens, and the whole round lenses have a common optical axis which is offset from a line of sight of the sighting device, said segments being located at a same side of said common optical axis with respect to a perpendicular direction thereto, away from said common optical axis and on the line of sight of the sighting device to be viewed by an observer's eye,
wherein a surface of said meniscus lens having positive refractive power that faces away from said target object or the surface of said meniscus lens having negative refractive power that faces toward said target object is adapted to constitute a semi-transparent reflection surface or a wavelength selective reflection surface,
wherein said semi-transparent reflection surface or said wavelength selective reflection surface and a refracting surface of said meniscus lens having negative refractive power, which refracting surface faces away from said target object side, form a catadioptric optical system,
wherein said meniscus lens having positive refractive power and said meniscus lens having negative refractive power have substantially zero refractive power for light rays transmitting therethrough;
wherein a point source is provided at a side of said semi-transparent reflection surface or said wavelength selective reflection surface where said negative meniscus lens is located and at a focal point of said catadioptric optical system on said common optical axis, to be disposed outside the field of view of the sighting device, and
wherein light beams from the point source reflected by said semi-transparent reflection surface or said wavelength selective reflection surface of the catadioptric optical system, are substantially parallel and the degree of parallelism of the reflected light beams is within ±2 minutes in the distance range of ±12 mm from the line of sight of the sighting device.

9. A sighting device according to claim 8, wherein said meniscus lens having positive refractive power and said meniscus lens having negative refractive power have only spherical surfaces.

10. A sighting apparatus according to claim 8, wherein said meniscus lens having positive refractive power and said meniscus lens having negative refractive power are cemented.

11. A sighting device according to claim 8, wherein said meniscus lens having positive refractive power and said meniscus lens having negative refractive power are made of the same optical material.

12. A sighting device comprising a cemented meniscus lens composed of, in order from a target object side:
a meniscus lens having positive refractive power with a convex surface facing toward the target object cemented, at a cemented surface, with a meniscus lens having negative refractive power with a convex surface facing toward said target object, the cemented meniscus lens as a whole having refractive power substantially equal to zero with a convex surface facing toward said target object,
wherein each meniscus lens is only a segment of a corresponding whole round lens, and the whole round lenses have a common optical axis that is offset from the line of sight of the sighting device, said segments being located at a same side of said common optical axis with respect to a direction perpendicular thereto and away from said common optical axis,
wherein said cemented surface is adapted to constitute a semi-transparent reflection surface or a wavelength selective reflection surface, wherein said semi-transparent reflection surface or said wavelength selective reflection surface and a refracting surface of said meniscus lens having negative refractive power, which refracting surface faces away from said target object side, form a catadioptric optical system, wherein a point source is provided at a side of said semi-transparent reflection surface or said wavelength selective reflection surface where said negative meniscus lens is located and at a focal point of said catadioptric optical system on the common optical axis, to be disposed outside the field of view of the sighting device, and wherein light beams from the point source reflected by said semi-transparent reflection surface or said wavelength selective reflection surface of the catadioptric optical system, are substantially parallel and the degree of parallelism of the reflected light beams is within ±2 minutes in the distance range of ±12 mm from the line of sight of the sighting device.

13. A sighting device according to claim 12, wherein thickness of the meniscus lens having positive refractive power decreases progressively in a direction away from the common optical axis, and thickness of the meniscus lens having negative refractive power increases progressively away from the common optical axis.

14. A sighting device according to claim 13, wherein each segment extends to the periphery of the corresponding whole round lens.

15. A sighting device comprising, in order from a target object side;
a meniscus lens having positive refractive power with a convex surface facing toward the target object; and
a meniscus lens having negative refractive power with a convex surface facing toward the target object,
wherein each meniscus lens is only a segment of a corresponding whole round lens, and the whole round lenses have a common optical axis which is offset from a line of sight of the sighting device, said segments being located at a same side of said common optical axis with respect to a perpendicular direction thereto, away from said common optical axis and on the line of sight of the sighting device to be viewed by an observer's eye,
wherein a surface of said meniscus lens having positive refractive power that faces away from said target object or the surface of said meniscus lens having negative refractive power that faces toward said target object is adapted to constitute a semi-transparent reflection surface or a wavelength selective reflection surface,
wherein said semi-transparent reflection surface or said wavelength selective reflection surface and a refracting surface of said meniscus lens having negative refractive power, which refracting surface faces away from said target object side, form a catadioptric optical system,
wherein said meniscus lens having positive refractive power and said meniscus lens having negative refractive power have substantially zero refractive power for light rays transmitting therethrough,
wherein a point source is provided at a side of said semi-transparent reflection surface or said wavelength selective reflection surface where said negative meniscus lens is located and at a focal point of said catadioptric optical system on said common optical axis, to be disposed outside the field of view of the sighting device, and
wherein the sighting device further includes a dust prevention lens disposed on the target object side and a dust prevention lens on the observer's eye side, both the dust prevention lenses having substantially zero refractive power and slightly curved surfaces to reflect and make undesirable light less conspicuous for the observer's eye.

16. A sighting device according to claim 15, wherein said meniscus lens having positive refractive power and said meniscus lens having negative refractive power have only spherical surfaces.

17. A sighting apparatus according to claim 15, wherein said meniscus lens having positive refractive power and said meniscus lens having negative refractive power are cemented.

18. A sighting device according to claim 15, wherein said meniscus lens having positive refractive power and said meniscus lens having negative refractive power are made of the same optical material.

19. A sighting device comprising a cemented meniscus lens composed of, in order from a target object side:
a meniscus lens having positive refractive power with a convex surface facing toward the target object cemented, at a cemented surface, with a meniscus lens having negative refractive power with a convex surface facing toward said target object, the cemented meniscus lens as a whole having refractive power substantially equal to zero with a convex surface facing toward said target object,
wherein each meniscus lens is only a segment of a corresponding whole round lens, and the whole round lenses have a common optical axis that is offset from a line of sight of the sighting device, said segments being located at a same side of said common optical axis with respect to a direction perpendicular thereto and away from said common optical axis,
wherein said cemented surface is adapted to constitute a semi-transparent reflection surface or a wavelength selective reflection surface,
wherein said semi-transparent reflection surface or said wavelength selective reflection surface and a refracting surface of said meniscus lens having negative refractive power, which refracting surface faces away from said target object side, form a catadioptric optical system,
wherein a point source is provided at a side of said semi-transparent reflection surface or said wavelength selective reflection surface where said negative meniscus lens is located and at a focal point of said catadioptric optical system on the common optical axis, to be disposed outside the field of view of the sighting device, and
wherein the sighting device further includes a dust prevention lens disposed on the target object side and a dust prevention lens on the observer's eye side, both the dust prevention lenses having substantially zero refractive power and slightly curved surfaces to reflect and make undesirable light less conspicuous for the observer's eye.

20. A sighting device according to claim 19, wherein thickness of the meniscus lens having positive refractive power decreases progressively in a direction away from the common optical axis, and thickness of the meniscus lens having negative refractive power increases progressively away from the common optical axis.

21. A sighting device according to claim 20, wherein each segment extends to the periphery of the corresponding whole round lens.

* * * * *